Jan. 9, 1962  O. J. BRATZ  3,015,969
PUSH-PULL CABLE
Filed April 1, 1958
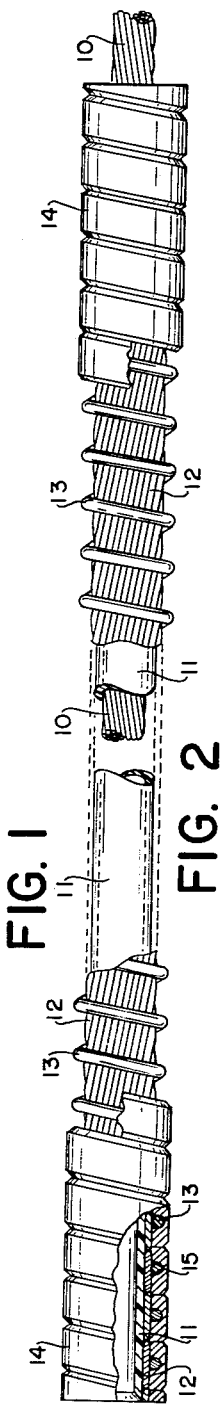
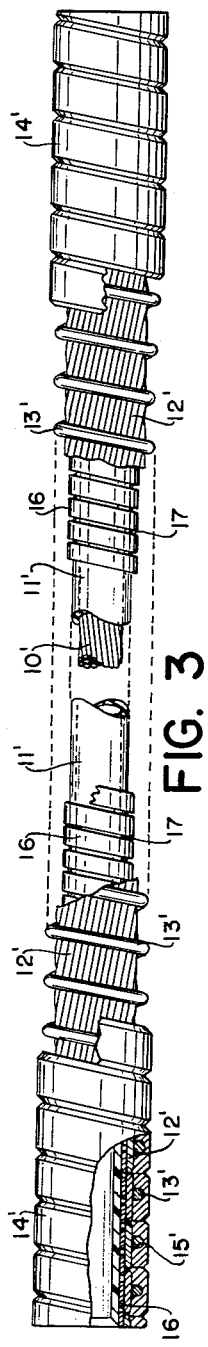
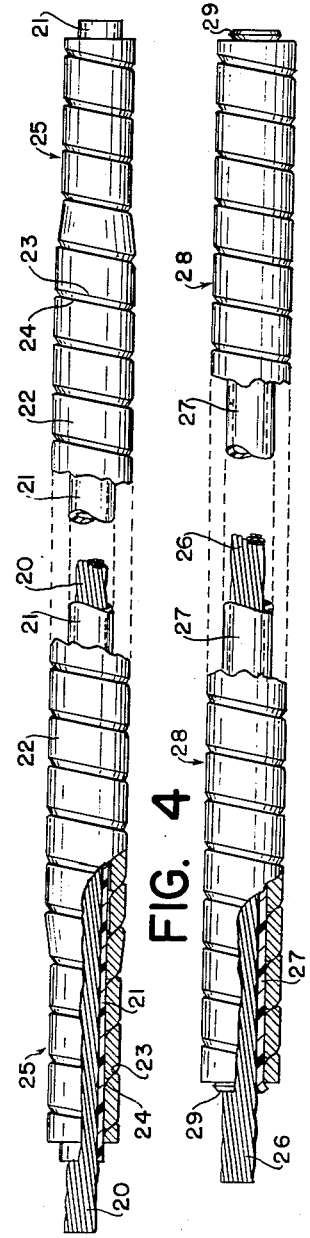
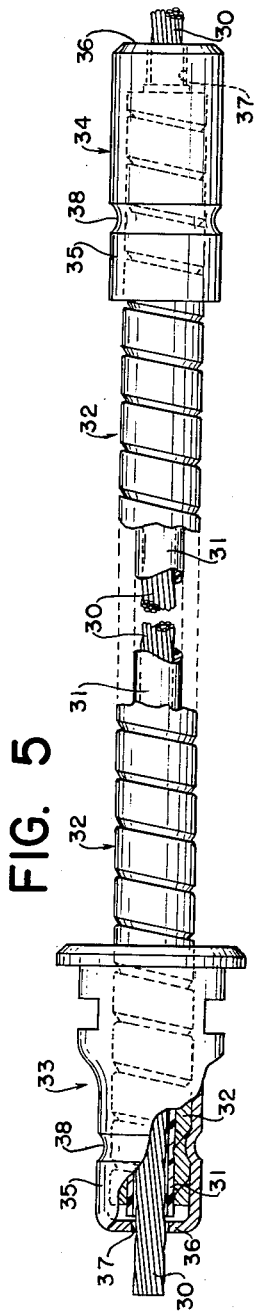
INVENTOR.
OTTO J. BRATZ
BY
ATTORNEYS United States Patent Office 3,015,969
Patented Jan. 9, 1962

3,015,969
PUSH-PULL CABLE
Otto J. Bratz, Adrian, Mich., assignor to American Chain & Cable Company, Inc., a corporation of New York
Filed Apr. 1, 1958, Ser. No. 725,597
16 Claims. (Cl. 74—501)

This invention relates to push-pull cable assemblies, and is particularly directed to the provision of an improved assembly in which a resinous plastic tube, preferably of a superpolyamide (nylon) or polytetrafluorethylene forms the guideway in which the axially movable (push-pull) core element is received and travels. This application is a continuation-in-part of my copending application Serial No. 646,297, filed March 15, 1957, and now abandoned.

Push-pull cable assemblies comprise essentially a tubular casing, which in use is anchored substantially immovably at its ends, and a flexible wire core element which can be moved axially within the tube by pushing or pulling on one end to exert a corresponding force on a device attached to the other end. In push-pull devices capable of transmitting substantial forces (of the order of tens or even hundreds of pounds), which is the type of push-pull cable assembly with which the present invention is primarily concerned, it is necessary that its components meet a number of important design considerations, including particularly the following: The tubular casing element must be flexible, yet must not become distorted or deformed in cross section when bent on a reasonable radius of curvature, or lengthen or shorten when subjected to the forces incident to its normal use. The core element must be substantially inextensible and incompressible, and must fit closely within the tubular element. The core element must slide freely within the tubular casing despite such reasonable bends as may be made in it. The core element must be capable of back and forth axial movement almost indefinitely under the maximum load it is designed to carry without failure of either the core element or the casing assembly. And the casing assembly must form a substantially impervious covering about the core element to preclude the penetration of moisture, dust or any other substance which by corrosion, abrasion or other effect might impair the freedom of movement of the core element or otherwise lead to failure of the assembly.

Heretofore these criteria have been most adequately met by making the entire cable assembly of steel wire. In devices for transmitting substantial push-pull forces, the core element has been a stranded steel cable, and the tubular casing element in which it moves has been made of helically coiled steel wires. To provide a smooth sliding surface to receive the core element, it has been common practice to make the casing with an inner tubular element of flat-surfaced wire coiled in the form of a short pitch helix, the turns of which are spaced apart to assure that the neutral axis of bending will coincide with the axis of the tube. An outer layer of helically applied wires is then laid over the inner helically coiled tube to protect it and provide a casing of adequate mechanical strength, as shown, for example, in my prior Patent No. 2,187,873, granted January 23, 1940.

Push-pull cables of the character described have proved mechanically very satisfactory. However, it has not been possible to assure that the casing will not be penetrated by moisture, dust and other foreign substances (even though sure protection against such penetration is often of prime importance) except by providing it with a protective outer covering of rubber or the like. For example, push-pull cables used to actuate mechanical vehicle brakes are usually fully exposed over at least a portion of their length to all the mud and dust of the road or field in which the vehicle operates. If moisture or dirt penetrates the cable casing, the corrosion or abrasion which can thereby be caused on the sliding surfaces may result in the core element seizing to the casing, rendering the cable totally inoperative, or it may result in rapid wear of the cable components and failure of the assembly on that account. To seal the cable casing against penetration of moisture and dust, it has been the practice heretofore to lay packing threads in the interstices between the wires forming the outer sheath and the helically coiled inner layer of the casing. While a notable improvement in the ability of the casing to resist penetration by dust and moisture is thereby achieved, the protection which the packing threads provides is by no means complete.

A further disadvantage of the all-steel construction is that special lubricants are required to assure free operation of the steel core element within the steel casing, and especially to assure that the force required to initiate movement of the core element (i.e. to overcome the static friction between core element and casing) will be small. Any penetration of moisture into the cable renders these special lubricants unstable, with resulting great loss in operating efficiency of the cable.

Experiments have shown that resinous plastic tubing can be utilized as the inner component of a push-pull cable casing without impairing its flexibility, and usually without introducing excessive back lash in operation of the cable, provided the neutral bending axis of the cable casing (i.e., the axis along which there is no change in length when the cable is bent) coincides substantially with its geometrical axis, and provided the plastic tube is effectively restrained against over-all longitudinal movement relative to the overlying sheath. Such cables may readily be constructed to operate without substantial diminution of the force which the cable can transmit, and without reduction in the service life of the cable under full load or the efficiency (that is, the ratio of output force to input force). Indeed, when the most advantageous of the available plastic materials are employed, the service life of the cable, or its efficiency, or both, may be increased. At the same time, the use of a plastic tube greatly simplifies construction of the cable casing for the purpose of rendering it completely impervious to moisture, dust and all other foreign matter; and it often makes possible the use of standard stable lubricants without introducing high static friction between core element and plastic tube.

A push-pull cable assembly according to this invention comprises a resinous plastic tube (preferably a superpolyamide or polytetrafluorethylene tube) surrounded by a flexible metallic sheath. The sheath is formed of at least one metallic wire extending helically about the plastic tube in the form of a substantially closed coil having its neutral bending axis extending substantially along its geometrical center line, and is designed to impart adequate mechanical strength to the casing to resist extension or compression, or other deformation, under the maximum load normally imposed on it and to protect the plastic tube from mechanical deformation or injury. The plastic tube is firmly restrained against over-all longitudinal movement relative to the sheath, but must be free to accommodate the slight relative motion that occurs between adjacent turns of the sheath coil when the casing is bent. The sheath may comprise a multiplicity of wires laid side by side and wrapped helically with a long pitch in the form of a closed coil surrounding the plastic tube, or it may comprise one or more substantially flat wires wrapped helically in the form of a substantially closed coil about the plastic tube; and sometimes it is desirable to form the sheath of a flat wire wound in the form of an open helical coil of short pitch surrounded by a multiplicity of helically applied wires laid on with a long pitch. In any case, the metallic sheath is applied in firm gripping relation with the plastic tube over at least a portion of its length, or at least the ends of the plastic tube are anchored against the ends of the sheath, in order to hold such tube securely against any over-all longitudinal movement relative to the sheath. The cable assembly is completed by a close fitting flexible metallic core element which extends through the plastic tube and is freely movable longitudinally therein.

Effective restraint of the plastic tube against over-all movement relative to the sheath is of major importance, for if the plastic tube is free to move axially to any substantial extent within the sheath, the performance and service life of the cable assembly is materially reduced. By "over-all" movement of the plastic tube relative to the sheath is meant movement which results in displacement of substantially the entire length of the plastic tube or a major part of it, within the sheath. While such movement is to be avoided, the small localized movements of adjacent turns or wires of the sheath coil relative to each other and to the plastic tube must be accommodated by the plastic tube or the casing as a whole will lack flexibility.

It is important that the metallic sheath be constructed so that its neutral bending axis extends substantially along its geometrical axial center line. Then there is substantially no change in length of the sheath relative to the plastic tube when the assembly is bent, and the plastic tube can be firmly restrained at both ends of the assembly, or throughout its length, against over-all longitudinal movement relative to the sheath, for example by having both ends of the sheath, or the entire length of the sheath, compressed into tight gripping engagement with the plastic tube. If the neutral bending axis of the cable casing is substantially displaced from its axial center line, the plastic tube cannot be firmly restrained against over-all longitudinal movement relative to the sheath without seriously impairing flexibility of the casing.

Preferred embodiments of push-pull cable assemblies according to this invention are described below with reference to the accompanying drawings, in which FIG. 1 is an elevation, partially in section, of a push-pull cable assembly having a casing formed of a multiplicity of round wires wrapped side by side in long pitch helices about a plastic tube.

FIG. 2 is an elevation, partially in section, of a push-pull cable assembly similar to that of FIG. 1 but having a coiled flat wire interposed between the plastic tube and the outer sheath structure;

FIG. 3 is an elevation partially in section, of a push-pull cable assembly in which the casing is formed of a substantially flat wire of generally trapezoidal cross section helically coiled about a plastic tube;

FIG. 4 is an elevation, partially in section, of a push-pull cable assembly similar to that of FIG. 3, but with the ends of the plastic tube flared outwardly to restrain it from axial movement relative to the metallic sheath; and FIG. 5 is an elevation, partially in section, of a push-pull cable assembly similar to that of FIG. 3 but provided with end ferrules compressed tightly against the casing.

The cable assembly of FIG. 1 comprises a flexible core element 10 in the form of a stranded cable of steel or other metallic wires. The core element is received in a casing comprising an inner tube 11 of plastic material, preferably a superpolyamide resin (nylon) or polytetrafluorethylene. The plastic tube preferably is an extruded seamless tube of moderate wall thickness (e.g. about 0.015 inch wall thickness in the case of a tube of about ⅛ inch inside diameter), and its inside diameter is only enough greater than the outside diameter of the core element so the latter can slide freely in the tube. Preferably also a generous coating of a lubricant is provided in the tube to ease the axial movement of the core element.

The casing further comprises a metallic sheath formed of a multiplicity of steel or other metallic wires 12 laid side by side and helically with a long pitch about the plastic tube 11. The wires 12 are wrapped very closely about the tube, in firm gripping relation with it throughout substantially its entire length to hold it securely against over-all longitudinal movement relative to the casing sheath. The engagement of the wires 12 with the plastic tube 11 is not such as to cause an interlocking or bonding of these components together, however. The gripping relation of the wires 12 with the plastic tube must permit the small and localized relative movements between adjacent wires which occurs when the cable assembly is bent. These small relative movements are mainly in an axial direction, and if they are restrained from occurring the casing will lack flexibility.

The wires 12 which form the sheath may be preformed to the helical configuration which they assume in the sheath, and if so preformed, the cable casing may consist solely of the plastic inner tube 11 and the surrounding sheath of wires 12. Alternatively, a binder wire 13 is wrapped in the form of an open coil tightly about the sheath wires 12 to hold them securely in place in firm gripping engagement with the tube 11. To secure the binder wire 13 in place, a metallic seizing strip 14 is wrapped helically about it at each end of the cable casing. The seizing strip is formed on one side with a groove 15 just large enough to receive the binder wire, and it is wrapped in place about several turns of the binder wire at the ends of the casing under a state of impact so as to seize the binder wire 13 securely.

A sheath constructed as shown in FIG. 1 with the sheath wires extending in long pitch helical paths has a neutral bending axis which coincides substantially with its geometrical axis. Such sheath undergoes no axial change in length with respect to the plastic tube when it is bent, and therefore it may grip the plastic tube over the entire length of the assembly without impairing the freedom of the casing to bend.

Instead of forming the sheath by laying the wires 12 tightly about the plastic tube, the sheath may be formed separately and the plastic tube may then be inserted in it, and then the seizing strips 14 may be compressed enough to cause the end portions of the sheath to grip the end portions of the tube and thus secure it tightly against longitudinal movement relative to the sheath.

The cable assembly of FIG. 2 is basically the same as that of FIG. 1. It comprises a flexible steel cable core element 10' which fits closely in a tube 11' of plastic material, preferably nylon or polytetrafluorethylene. This plastic tube forms the inner element of a casing having as its outer component a tubular structure formed of a multiplicity of steel wires 12' laid side by side in the form of a long pitch helix, and secured in place by a binder wire 13'. The binder wire is held in place at each end by a seizing strip 14' which is applied under a state of impactment.

The cable of FIG. 2 differs from that of FIG. 1, in that a wire 16, preferably a relatively thin flat wire, is wrapped helically about the plastic tube 10', under the outer casing wires 12'. The flat wire 16 is applied in the form of a short pitch helix, with adjacent turns spaced apart as indicated at 17. This spacing is necessary so that the inner casing coil formed by the wire 16 will have its neutral bending axis coincident with its geometrical center line.

The inner casing coil of flat wire 16 provides mechanical support for the underlying plastic tube, and in particular protects it from becoming deformed or crushed in any objectionable way by the outer casing wires 12'. Preferably the wires 12' are quite hard and stiff in order to insure that the casing will be able to resist the high compressive force to which it is subjected when a strong pulling force is exerted on the core element 10'. When these hard, stiff outer casing wires 12 are wound in place without being preformed, they exert a substantial crushing or compressive force on the underlying casing components; and unreinforced plastic tubing, particularly tubing of the relatively softer plastics such as polytetrafluoroethylene, are not always able to withstand this crushing force unassisted. The inner casing coil formed by the wire 16 provides such reinforcement as is necessary to assure that hard, stiff outer wires 12 may be laid in place tightly without crushing or otherwise deforming the inner plastic tube 11'. The wire 16 is preferably thin and flat because thereby the bulk of the cable can be held at a minimum. It is apparent, however, that a round wire can perform the same functions as the flat wire. The compressive force exerted by the outer casing wires 12 urges the inner casing coil into firm gripping engagement with the plastic tube throughout substantially its entire length and holds it securely against over-all longitudinal movement relative to the sheath wires. Such gripping force, however, does not prevent the slight relative motion that occurs between adjacent turns of the wire 16 when the cable assembly is bent. Such slight relative motion is readily accommodated due to the fact that the entire metallic sheath—the inner casing coils of wire 16 and the tubular assembly of outer casing wires 12'—has its neutral bending axis extending substantially along its geometrical center line.

The push-pull cable assembly shown in FIG. 3 comprises a flexible core element 20 in the form of a stranded cable of steel or other metallic wires. The core element is slidably disposed in a casing of which the inner component is a plastic tube 21.

In this form of cable assembly also the plastic tube is preferably a seamless extruded tube of moderate wall thickness and of inside diameter only slightly greater than the outside diameter of the core element, and preferably is composed of a superpolyamide resin (nylon) or polytetrafluoroethylene. The core element should be well lubricated inside the tube to facilitate its movement in the tube. The tube is protected and strengthened by an outer sheath composed of a substantially flat wire 22 coiled with its edges side by side in a fairly short pitch helix. The wire 22 in cross section is substantially trapezoidal, with rounded corners, so that when it is coiled about the tube 21 the leading edge 23 of one turn underlies the trailing edge 24 of the adjacent turn. This construction is such as to form a sheath in which adjacent turns abut, enabling the sheath to withstand high compressive forces without deformation. However, the generally trapezoidal cross section of the wire and the underlying relation of the leading edge of each convolution to the trailing edge of the adjacent convolution enables each convolution to pivot relative to its neighbors similarly to a ball in a socket; and to the limited extent that such ball and socket type of pivoting can occur between adjacent convolutions, the neutral bending axis of the sheath falls substantially along its geometrical center line.

It is not generally practical to apply the sheath wire 22 about the plastic tube 21 tightly in the first instance. Indeed, in producing a cable assembly of the character shown in FIG. 3, it is often desirable to coil the sheath wire 22 and then to insert the plastic tube in place. In order to cause the sheath to hold the plastic tube securely against over-all longitudinal movement, the sheath is swaged down into firm gripping engagement with the tube after the sheath has been coiled and the plastic tube inserted in place. In the form of cable assembly shown in FIG. 2, a number of convolutions of the sheath adjacent the ends of the casing, indicated at 25, have thus been swaged to a reduced diameter and into firm gripping relation with the ends of the plastic tube. For some purposes, it is sufficient if the sheath grips the tube only at separated locations, as at the ends of the assembly. In many cases, however, it will be found preferable in a cable of the character shown in FIG. 3 to compact the sheath into secure gripping engagement with the plastic tube over substantially the entire length of the cable assembly. In either case, small relative motion between adjacent turns of the sheath helix that occurs when the cable assembly is bent is free to occur without deforming the plastic tube, because there is no actual seizing or interlocking of the plastic tube to the sheath coil.

The cable assembly of FIG. 4 is generally similar to that of FIG. 3, except for the means provided for restraining the plastic tube of the casing from moving longitudinally relative to the sheath. In this assembly the core element 26, comprising a stranded steel cable, is slidably received in a casing comprising a seamless plastic tube 27 disposed within a sheath 28 formed by helically wrapping a wire of approximately trapezoidal cross section into a closed coil (i.e. a coil having adjacent turns firmly abutting). The sheath is of the same construction described with reference to FIG. 3, and its neutral bending axis extends substantially along its center line. In the embodiment of FIG. 4, however, the plastic tube is not tightly gripped by the sheath. Instead it is inserted into the sheath after the latter has been formed, and then its ends 29 are flared outwardly to a diameter substantially greater than the bore of the sheath, preferably so that there is little or no clearance between each flare and the adjacent end of the sheath. The flared ends restrain the tube 27 from axial movement within the sheath 28. Since the neutral bending axis of the sheath coincides with its center line, the sheath does not increase in length relative to the plastic tube when the assembly is bent. If it were not for this characteristic of the sheath, the cable could not be bent without breaking or deforming its end enlargements. If desired, the sheath 28 may be swaged down into tight gripping engagement with the tube over some part, or all, of its length, in addition to flaring the ends 29 as shown.

The cable assembly of FIG. 5 embodies an alternative arrangement for securing the plastic tube against axial movement relative to the sheath. In this embodiment a stranded cable core element 30 is received for axial sliding movement in a casing comprising a plastic tube 31 enclosed in a sheath 32 formed by helically winding a flat wire of substantially trapezoidal cross section into the form of a closed coil. The sheath is of the same construction shown in FIGS. 3 and 4, and has a neutral bending axis which extends substantially along its axial center line. The plastic tube is inserted into the sheath after the latter has been formed, and is secured in place by the fastening of ferrules 33 and 34 to the ends of the casing. Each ferrule comprises a cylindrical body portion 35 which fits snugly about an end portion of the sheath 32, and an in-turned end 36 formed with a central opening 37 through which the core element 30 extends. The opening 37 preferably is smaller in diameter than the outside diameter of the plastic tube 31, so that this tube cannot pass through it, whereby the tube is restrained from longitudinal movement. Each ferrule is fastened in place by being compressed tightly against the sheath 32 along a narrow circumferential zone of impactment 38. Such compression in turn compresses the sheath where it underlies the zone of impactment into tight gripping engagement with the plastic tube, and thus additionally secures the tube against longitudinal movement relative to the sheath. If in any case the compression of the fitting in the zones 38 should be inadequate to cause the plastic tube to be gripped tightly by the sheath, it will nonetheless be restrained against longitudinal movement relative to the sheath by the in-turned ends 36 of the ferrule.

The zones of impactment 38 are shown in FIG. 5 as being very narrow. They may, of course, be made as wide as the length of the close-fitting tubular portions 35 of the ferrules permit. Also, it is possible if desired to compress the sheath tightly against the plastic tube over any desired portion of its length, quite independently of the attachment of the ferrule to the casing; and in such event neither the in-turned ends 36 of the ferrules nor the compression of the ferrules themselves about the casing, need be relied on to secure the plastic tube in place.

The most suitable materials of which to make the plastic tube liner employed in the above-described assemblies are superpolyamide resins (commonly known as nylon and prepared, for example, by reacting hexamethylene tetramine with adipic acid) and polytetrafluorethylene. These materials have been found to be almost unique in their suitability for use in push-pull cable assemblies intended to transmit heavy forces. Numerous other plastic compositions in tubing form have been tried for this purpose and found wanting in one or more of the properties which are especially desirable for heavy duty service in push-pull controls. Some of them are too soft for general use and are quickly cut through by longitudinal movement of the core element in transmitting heavy loads around bends in the cable assembly. Others are undesirably stiff and brittle for use in a cable having the degree of flexibility generally required of push-pull cable assemblies. Still others display a high coefficient of friction when operated in combination with a steel core element, even though the assembly is well lubricated. Superpolyamide resins and polytetrafluorethylene, however, have each been found during the course of an extensive series of trials to possess an excellent combination of properties for this use. They are adequately hard and strong to resist the heavy compressive forces to which the plastic tube is subjected when the core element transmits a heavy load around a bend in the cable assembly (though superpolyamide resins are substantially the better of the two in this respect). They have adequate mechanical strength so that a tube made of either one is capable of resisting crushing or deformation when the sheath wire or wires are applied in firm gripping engagement with them (though here again the superpolyamide resin tubes are the better). They are both adequately flexible to meet the flexing requirements of push-pull cable assemblies. And they both display a low coefficient of friction in combination with steel and other metallic core elements, both at the start of relative motion and during relative motion, so that when well lubricated a minimum excess of force need be applied to the core element at one end of the cable assembly to produce the desired force at the other end. In this respect polytetrafluorethylene is substantially the better, for in standard comparison tests involving the transmission of heavy loads through 270° of sharp bends, its use has resulted in cable operation efficiencies of 70% or higher, whereas standard all-steel cables and cables having a casing liner tube of superpolyamide resin were only 50% efficient.

I claim:

1. In a push-pull cable assembly, a casing comprising an outer metallic sheath formed of at least one wire wrapped helically in the form of a coil having its neutral bending axis extending substantially along the center line of the coil and a resinous plastic tube disposed within and extending throughout the length of said sheath, said plastic tube being restrained against over-all longitudinal movement relative to said sheath but being free to accommodate the slight relative motion that occurs between adjacent turns of the sheath coil when the casing is bent, and a flexible metallic core element extending through said plastic tube and directly engageable therewith and freely movable longitudinally therein.

2. In a push-pull cable assembly, a casing comprising an outer metallic sheath formed of at least one wire wrapped helically in the form of a coil having its neutral bending axis extending substantially along the center line of the coil and a nylon tube disposed within and extending throughout the length of said sheath, said nylon tube being restrained against over-all longitudinal movement relative to said sheath but being free to accommodate the slight relative motion that occurs between adjacent turns of the sheath coil when the casing is bent, and a flexible metallic core element extending through said nylon tube and directly engageable therewith and freely movable longitudinally therein.

3. In a push-pull cable assembly, a casing comprising an outer metallic sheath formed of at least one wire wrapped helically in the form of a coil having its neutral bending axis extending substantially along the center line of the coil and a polytetrafluorethylene tube disposed within and extending throughout the length of said sheath, said polytetrafluorethylene tube being restrained against over-all longitudinal movement relative to said sheath but being free to accommodate the slight relative motion that occurs between adjacent turns of the sheath coil when the casing is bent, and a flexible metallic core element extending through said polytetrafluorethylene tube and directly engageable therewith and freely movable longitudinally therein.

4. A push-pull cable assembly comprising a resinous plastic tube, a flexible metallic sheath surrounding said tube, said sheath comprising a multiplicity of wires laid side by side and wrapped helically with a long pitch in the form of a closed coil having a neutral bending axis extending substantially along the center line of the coil, said sheath being applied in firm gripping relation with said plastic tube over substantially its entire length and holding it securely against over-all longitudinal movement relative to the sheath while permitting the slight relative motion that occurs between adjacent wires of the sheath coil when the sheath is bent, and a flexible metallic core element extending through said tube and directly engageable therewith and freely movable longitudinally therein.

5. A push-pull cable assembly comprising a nylon tube, a flexible metallic sheath surrounding said tube, said sheath comprising a multiplicity of wires laid side by side and wrapped helically with a long pitch in the form of a closed coil having a neutral bending axis extending substantially along the center line of the coil, said sheath being applied in firm gripping engagement with said nylon tube over substantially its entire length and holding it securely against over-all longitudinal movement relative to the sheath while permitting the slight relative motion that occurs between adjacent wires of the sheath coil when the sheath is bent, and a flexible metallic core element extending through said tube and directly engageable therewith and freely movable longitudinally therein.

6. A push-pull cable assembly comprising a polytetrafluorethylene tube, a flexible metallic sheath surrounding said tube, said sheath comprising a multiplicity of wires laid side by side and wrapped helically with a long pitch in the form of a closed coil having a neutral bending axis extending substantially along the center line of the coil, said sheath being applied in firm gripping engagement with said polytetrafluorethylene tube over substantially its entire length and holding it securely against longitudinal movement relative to the sheath while permitting the slight relative motion that occurs between adjacent wires of the sheath coil when the sheath is bent, and a flexible metallic core element extending through said tube and directly engageable therewith and freely movable longitudinally therein.

7. A push-pull cable assembly comprising a nylon tube, a flexible metallic sheath surrounding said tube, said sheath comprising a multiplicity of wires laid side by side and wrapped helically with a long pitch in the form of a closed coil having a neutral bending axis extending substantially along the center line of the coil, a binding wire wrapped helically with a relatively short pitch about said closed coil, and seizing members securing said binding wire in place at each end of the coil, said nylon tube being securely held by the sheath against over-all longitudinal movement relative thereto but being free to accommodate the slight relative motion that occurs between adjacent wires of the sheath when the sheath is bent, and a flexible metallic core element extending through said nylon tube and directly engageable therewith and freely movable longitudinally therein.

8. A push-pull cable assembly comprising a polytetrafluorethylene tube, a flexible metallic sheath surrounding said tube, said sheath comprising a multiplicity of wires laid side by side and wrapped helically with a long pitch in the form of a closed coil having a neutral bending axis extending substantially along the center line of the coil, a binding wire wrapped helically with a relatively short pitch about said closed coil, and seizing members securing said binding wire in place at each end of the coil, said polytetrafluorethylene tube being securely held by the sheath against over-all longitudinal movement relative thereto but being free to accommodate the slight relative motion that occurs between adjacent wires of the sheath when the sheath is bent, and a flexible metallic core element extending through said polytetrafluorethylene tube and directly engageable therewith and freely movable longitudinally therein.

9. A push-pull cable assembly comprising a resinous plastic tube, a flexible metallic sheath surrounding said tube, said sheath having a neutral bending axis extending substantially along the center line of said tube, and comprising an inner casing wire wound closely about the plastic tube in the form of a helical coil of short pitch with adjacent turns spaced apart, and a multiplicity of outer casing wires laid side by side and wrapped helically with a long pitch closely about said inner casing coil, said inner casing coil being compressed by the outer casing wires into firm gripping engagement with said plastic tube and holding it securely against over-all longitudinal movement relative to the sheath while permitting the slight relative motion that occurs between adjacent turns of the inner casing coil when the sheath is bent, and a flexible metallic core element extending through said plastic tube and directly engageable therewith and freely movable longitudinally therein.

10. A push-pull cable assembly comprising a nylon tube, a flexible metallic sheath surrounding said tube, said sheath having a neutral bending axis extending substantially along the center line of said tube, and comprising a flat wire wound closely about the nylon tube in the form of a helical coil of short pitch with adjacent turns spaced apart, and a multiplicity of wires laid side by side and wrapped helically with a long pitch closely about said flat wire coil, said flat wire coil being compressed by the overlying wires into firm gripping engagement with said nylon tube and holding it securely against over-all longitudinal movement relative to the sheath while permitting the slight relative motion that occurs between adjacent turns of the flat wire coil when the sheath is bent, and a flexible metallic core element extending through said nylon tube and directly engageable therewith and freely movable longitudinally therein.

11. A push-pull cable assembly comprising a polytetrafluorethylene tube, a flexible metallic sheath surrounding said tube, said sheath having a neutral bending axis extending substantially along the center line of said tube, and comprising a flat wire wound closely about the polytetrafluorethylene tube in the form of a helical coil of short pitch with adjacent turns spaced apart, and a multiplicity of wires laid side by side and wrapped helically with a long pitch closely about said flat wire coil, said flat wire coil being compressed by the overlying wires into firm gripping engagement with said polytetrafluorethylene tube and holding it securely against over-all longitudinal movement relative to the sheath while permitting the slight relative motion that occurs between adjacent turns of the flat wire coil when the sheath is bent, and a flexible metallic core element extending through said polytetrafluorethylene tube and directly engageable therewith and freely movable longitudinally therein.

12. A push-pull cable assembly comprising a resinous plastic tube, a flexible metallic sheath surrounding said tube, said sheath comprising at least one substantially flat wire wrapped helically in the form of a coil having a neutral bending axis extending substantially along its center line, said sheath being compressed into firm gripping relation with said plastic tube over at least a part of its length and holding it securely against over-all longitudinal movement relative to the sheath while permitting the slight relative motion that occurs between adjacent turns of the sheath coil when the sheath is bent, and a flexible metallic core element extending through said plastic tube and directly engageable therewith and freely movable longitudinally therein.

13. A push-pull cable assembly comprising a nylon tube, a flexible metallic sheath surrounding said tube, said sheath comprising at least one substantially flat wire wrapped helically in the form of a coil having a neutral bending axis extending substantially along its center line, said sheath being compressed into firm gripping relation with said nylon tube over at least a part of its length and holding it securely against over-all longitudinal movement relative to the sheath while permitting the slight relative motion that occurs between adjacent turns of the sheath coil when the sheath is bent, and a flexible metallic core element extending through said nylon tube and directly engageable therewith and freely movable longitudinally therein.

14. A push-pull cable assembly comprising a polytetrafluorethylene tube, a flexible metallic sheath surrounding said tube, said sheath comprising at least one substantially flat wire wrapped helically in the form of a coil having a neutral bending axis extending substantially along its center line, said sheath being compressed into firm gripping relation with said polytetrafluorethylene tube over at least a part of its length and holding it securely against over-all longitudinal movement relative to the sheath while permitting the slight relative motion that occurs between adjacent turns of the sheath coil when the sheath is bent, and a flexible metallic core element extending through said polytetrafluorethylene tube and directly engageable therewith and freely movable longitudinally therein.

15. A push-pull cable assembly comprising a resinous plastic tube, a flexible metallic sheath surrounding said tube, said sheath comprising at least one substantially flat wire of substantially trapezoidal cross section wrapped helically in the form of a closed coil having a neutral bending axis extending substantially along its center line and capable of withstanding a substantial compressive force without deformation, said sheath being compressed firmly against said plastic tube at each end thereof and holding it securely against over-all longitudinal movement relative to the sheath while permitting the slight relative motion that occurs between adjacent turns of the sheath coil when the sheath is bent, and a flexible metallic core element extending through said nylon tube and directly engageable therewith and freely movable longitudinally therein.

16. A push-pull cable assembly comprising a resinous plastic tube, a flexible metallic sheath surrounding said tube, said sheath comprising at least one wire wrapped helically in the form of a closed coil having a neutral bending axis extending substantially along its geometrical center line and capable of withstanding a substantial compressive force without deformation, ferrules surrounding said sheath at each end thereof, said ferrules being compressed tightly against said sheath and compressing said sheath into firm gripping relation with the plastic tube adjacent one end thereof and thereby holding the plastic tube securely against longitudinal movement relative to the sheath while permitting the slight relative motion that occurs between adjacent turns of the sheath coil when the sheath is bent, and a flexible metallic core element extending through said nylon tube and directly engageable therewith and freely movable longitudinally therein.

References Cited in the file of this patent

UNITED STATES PATENTS

| | | |
|---|---|---|
| 1,951,723 | Burd et al. | Mar. 20, 1934 |
| 2,187,873 | Bratz | Jan. 23, 1940 |
| 2,382,966 | Arens | Aug. 21, 1945 |
| 2,416,206 | Norton | Feb. 18, 1947 |
| 2,706,494 | Morse | Apr. 19, 1955 |

FOREIGN PATENTS

| | | |
|---|---|---|
| 520,585 | Belgium | June 30, 1953 |